United States Patent [19]

Tokunaga et al.

[11] Patent Number: 5,911,905
[45] Date of Patent: Jun. 15, 1999

[54] PROCESSES FOR PRODUCING HYDRATED IRON OXIDE AND FERROMAGNETIC IRON OXIDE

[75] Inventors: Hideaki Tokunaga; Koji Nakata; Seiji Shinohara; Noriyuki Itofuji; Kouji Kurosaki; Nobuyuki Hashimoto, all of Yamaguchi-ken, Japan

[73] Assignee: Titan Kogyo Kabushiki Kaisha, Yamaguchi-ken, Japan

[21] Appl. No.: 09/020,508

[22] Filed: Feb. 9, 1998

[30] Foreign Application Priority Data

Feb. 10, 1997 [JP] Japan ..................................... 9-041592

[51] Int. Cl.$^6$ .......................... C01G 49/02; C01G 49/06; C01G 49/08
[52] U.S. Cl. ....................... 252/62.56; 423/632; 423/633; 423/634
[58] Field of Search .......................... 252/62.56; 423/632, 423/633, 634

[56] References Cited

U.S. PATENT DOCUMENTS 4,748,017   5/1988   Matsui et al. .......................... 423/634

FOREIGN PATENT DOCUMENTS 0 045 246 A1   2/1982   European Pat. Off. .
56-22638       3/1981   Japan .
52-38000 B4    9/1997   Japan .

*Primary Examiner*—Melissa Koslow
*Attorney, Agent, or Firm*—Pillsbury Madison & Sutro LLP

[57] ABSTRACT

In a process for producing hydrated iron oxide which comprises the steps of adding an aqueous alkali solution to an aqueous solution of a ferrous salt in an amount no more than a neutralizing equivalent amount with respect to said ferrous salt, oxidizing the resulting ferrous hydroxide containing suspension to produce the seed crystals of hydrated iron oxide and subsequently supplying an additional amount of alkali and oxidizing the hydrated iron oxide to grow, sulfurous acid or a sulfite is added to either the aqueous ferrous salt solution or the aqueous alkali solution or the suspension containing ferrous hydroxide before the oxidation of ferrous hydroxide starts. The resulting hydrated iron oxide may be used as a raw material to produce berthollide, maghemite or a cobalt-doped ferromagnetic iron oxide.

6 Claims, 2 Drawing Sheets

1 μm

PROCESSES FOR PRODUCING HYDRATED IRON OXIDE AND FERROMAGNETIC IRON OXIDE

BACKGROUND OF INVENTION

This invention relates to processes for producing hydrated iron oxide and ferromagnetic iron oxide. More specifically, the invention relates to a process for producing a hydrated iron oxide having a very narrow particle size distribution and a high aspect ratio and which is useful as a raw material for pigments, paints, catalysts and ferrites, and as a raw material for magnetic iron oxide for use as a magnetic recording medium. The invention also relates to a process by which an improved ferromagnetic iron oxide for use in coated magnetic recording media and so forth can be produced from the hydrated iron oxide.

As magnetic recording and reproducing apparatus become smaller and lighter in weight and as more information need be processed in magnetic recording, there are growing demands for increasing the density of recording in magnetic recording media, enhancing their output and rendering them less noisy. To meet these requirements, there have been more rigorous demands for better characteristics such as higher coercivity, greater amount of saturation magnetization, smaller particle size and higher degrees of orientation and packing.

To obtain a magnetic powder compliant with the above-mentioned requirements, it is important to improve the characteristics of the precursor hydrated iron oxide, such as its particle size, size distribution and aspect ratio (major-to-minor axis ratio). Under the circumstances, the conditions for the manufacture of hydrated iron oxide have been altered in various ways and subsequently put to trial use.

For example, Japanese Patent Publication No. 38000/1977 discloses a process for producing a hydrated iron oxide using a reactor comprising an air bubble column and Japanese Patent Public Disclosure No. 22638/1981 discloses a method using seed crystal prepared at room temperature. However, the first approach yields only goethite having a large particle size and the second approach yields magnetite unless strict temperature control is performed. Thus, it has been difficult to produce high-density magnetic materials from the hydrated iron oxides prepared by these methods.

SUMMARY OF INVENTION

An object, therefore, of the invention is to provide a process for producing goethite comprising fine particles with a very narrow size distribution and having high aspect ratio.

Another object of the invention is to provide a process by which a ferromagnetic iron oxide suitable for use in magnetic recording media and so forth can be produced from the goethite prepared by the stated process.

The present inventors conducted intensive studies with a view to obtaining a hydrated iron oxide that is suitable for use as a raw material for the manufacture of magnetic powders which satisfy the aforementioned requirements. The studies have become a basis for the accomplishment of the present invention which is described below.

Stated briefly, the present inventors made various studies on the step of preparing seed crystals for the synthesis of hydrated iron oxide with a view to solving the aforementioned problems of the prior art and found that the addition of sulfurous acid or a sulfite was effective in improving the particle size distribution of the seed crystals of hydrated iron oxide and inhibiting the formation of dendritic particles. In addition, the seed crystals of hydrated iron oxide were reduced in size but increased in aspect ratio.

It was also found that the hydrated iron oxide grown from said seed crystals retained the narrow size distribution and high aspect ratio and proved to be highly suitable for use as a raw material for the manufacture of magnetic powders which are required to possess the various characteristics stated above. The present invention has been accomplished on the basis of these findings.

Thus, the present invention relates to a process for producing hydrated iron oxide comprising the first step of adding an aqueous alkali solution to an aqueous solution of a ferrous salt in an amount no more than a neutralizing equivalent amount with respect to said ferrous salt to form a suspension containing ferrous hydroxide, the second step of oxidizing said suspension to form a suspension containing the seed crystals of hydrated iron oxide and the third step of supplying an additional amount of an alkali to said suspension containing hydrated iron oxide and oxidizing said suspension to have the hydrated iron oxide grow, characterized in that sulfurous acid or a sulfite is added in said first step in an amount of 0.1–10 mol % of the ferrous salt which will be neutralized to precipitate during the reaction of forming the seed crystals.

The process of the invention allows for positive production of a hydrated iron oxide that is improved in particle size distribution, that comprises fine particles and that is controlled to have high aspect ratio.

DESCRIPTION OF THE PREFERRED EMBODIMENT

Figure 1:
FIG. 1 is an electron photo-micrograph of the hydrated iron oxide produced in an example of the invention.

The hydrated iron oxide produced by the process outlined above may be subjected to the fourth step of heating and firing said hydrated iron oxide to form acicular hematite particles and to the fifth step of reducing said acicular hematite to magnetite.

If desired, said magnetite may be subjected to the sixth step of oxidation to form berthollide ($FeO_x$; $1.33<x<1.5$) or maghemite.

Said magnetite, berthollide or maghemite may be subjected to the seventh step of coating the surfaces of their particles with a cobalt-containing layer.

The thus obtained hydrated iron oxide can be used as a starting material to produce berthollide or maghemite particles that are improved in orientation characteristics and coercive force distribution.

Doping the magnetite, berthollide or maghemite particles with a cobalt-containing coating layer will give a ferromagnetic iron oxide powder having orientation characteristics and coercive force distribution that are very advantageous for use in magnetic tape capable of high density recording.

On the pages that follow, the starting materials to be used in the processes of the invention for producing hydrated iron oxide and ferromagnetic iron oxide are described in detail.

The aqueous ferrous salt solution to be used in the invention may be selected from among an aqueous ferrous sulfate solution, an aqueous ferrous chloride solution, an aqueous ferrous nitrate solution, and so forth.

Examples of the aqueous alkali solution to be added to form the seed crystals of hydrated iron oxide include an aqueous sodium hydroxide solution, an aqueous potassium hydroxide solution and aqueous ammonia. Examples of the alkali to be used in the growth reaction include an aqueous sodium hydroxide solution, an aqueous potassium hydroxide solution, aqueous ammonia and ammonia gas.

The oxidizers to be used for oxidation include air, oxygen and any other oxidizing agents. Air is advantageous for industrial applications.

Examples of the sulfurous acid or salts thereof to be added in the first step include sulfurous acid, alkali metal salts thereof, salts thereof such as ammonium salts that are represented by the general formula $M^1_2SO_3$, hydrogen sulfites represented by the general formula $M^1HSO_3$ as exemplified by sodium hydrogensulfite, potassium hydrogensulfite and ammonium hydrogensulfite, and pyrosulfites represented by the general formula $M^1_2S_2O_5$ as exemplified by sodium pyrosulfite, potassium pyrosulfite and ammonium pyrosulfite. The salts of sulfurous acid must be water-soluble so that they can be used in the invention. In the general formulae set forth above, $M^1$ stands for alkali metals such as sodium and potassium, and an ammonium group.

Sulfurous acid or the above-mentioned salt or salts thereof which are to be added in the first step are preferably added to an aqueous ferrous salt solution or an aqueous alkali solution or a suspension containing ferrous hydroxide.

Let us now describe the preferred way to implement the invention process for producing hydrated iron oxide. To begin with, assuming that sulfurous acid or a sulfite is added to either an aqueous ferrous salt solution or an aqueous alkali solution or a suspension containing the ferrous hydroxide generated by the reaction between the aqueous ferrous salt solution and the aqueous alkali solution, an aqueous alkali solution is further added to the aqueous ferrous salt solution in an amount no more than an equivalent amount to neutralize the ferrous salt, thereby forming a suspension containing ferrous hydroxide.

Sulfurous acid or a sulfite is added in an amount of 0.1–10 mol %, preferably 0.3–6 mol %, of the ferrous salt which will be neutralized to precipitate in the seed crystal forming reaction. If the addition of sulfurous acid or a sulfite is less than 0.1 mol %, seed crystals of high aspect ratio will not be obtained. If the addition of sulfurous acid or a sulfite exceeds 10 mol %, the aspect ratio of the seed crystals will decrease, rather than increase.

The aqueous ferrous salt solution has a Fe concentration of 10–100 g/L, preferably 20–90 g/L. The aqueous alkali solution is added in an amount of 10–80%, preferably 15–75%, of an equivalent amount that is sufficient to neutralize the Fe in the aqueous ferrous salt solution. These conditions can be set as appropriate for the desired particle size of the seed crystals.

Subsequently, the suspension is oxidized to generate the seed crystals of hydrated iron oxide at a temperature of 20–60° C., preferably 25–40° C. If the oxidizing temperature is lower than 20° C., an increasing amount of lepidocrocite will form to broaden the size distribution of the particles formed after the growth reaction; if the oxidizing temperature becomes higher than 60° C., the chance of the formation of particulate magnetite will increase.

The progress of the oxidizing reaction is not greatly influenced by the rate of oxidation; however, in industrial applications, the supply of an oxygen-containing gas and the rotational speed of the stirrer provided in the reaction tank are preferably adjusted such as to bring the reaction to an end within 60–600 minutes. Of course, a reaction tank not equipped with a stirrer may be employed.

After the reaction for the generation of seed crystals is brought to an end in the manner described above, an alkali is added to the suspension in a sufficient amount to maintain the pH at 2–6, optionally after the addition of an additional amount of an aqueous ferrous salt solution, whereby the seed crystals are oxidized and grown to the desired hydrated iron oxide.

Other methods of performing the growth reaction include: (1) supplying an alkali to the suspension in an amount less than equivalent to the $Fe^{2+}$ in the suspension and performing oxidation with an amount of alkali commensurate with the required oxidation being supplied continuously in the presence of a specified amount of a green test; (2) supplying an aqueous alkali carbonate solution to the suspension in an amount about 1.5 times the amount equivalent to the $Fe^{2+}$ in the suspension and performing oxidation with the pH adjusted to 8–10 during the growth reaction; and (3) supplying an aqueous alkali hydroxide solution to the suspension in an amount about twice the amount equivalent to the $Fe^{2+}$ in the suspension and performing oxidation with the pH adjusted to 12 or more during the growth reaction. These methods are also capable of yielding hydrated iron oxide particles having a narrow size distribution and a high aspect ratio.

The thus obtained hydrated iron oxide are filtered and washed with water to remove the residual salts and so forth from the suspension and, thereafter, subjected to a post-treatment with a sinter preventive such as a silicon or phosphorus compound, filtered and washed with water again, and dried in air at 100–200° C. to produce a raw material for acicular ferromagnetic iron oxide particles.

In the next step, the hydrated iron oxide is dehydrated with heat, reduced and optionally subjected to partial or complete oxidation by a known procedure. The dehydration with heat is performed by heating in air at 300°–900° C. for 0.5–3 hours. The reduction is performed in a reducing atmosphere such as under a hydrogen gas stream at 300–400° C. to form magnetite. Optionally, the magnetite is subjected to partial oxidation in an oxidizing atmosphere such as air at 60–150° C. or a mixture of air and nitrogen gas at 60–200° C. to yield berthollide ($FeO_x$; $1.33<x<1.5$) containing the desired iron(II) content, or it may be subjected to complete oxidation in air at 60–300° C. to yield maghemite.

The thus obtained particles of magnetite, berthollide or maghemite may be coated on the surface with a cobalt-containing layer by a known method. Advantageously, the particles may be doped with a solution containing a cobalt salt either alone or in combination with a ferrous salt so that they are coated with a cobalt or a cobalt ferrite layer, thereby enhancing the coercive force to provide a further improvement in the magnetic characteristics. The doping may be performed in the following manner: an alkali and a cobalt salt and, optionally, a ferrous salt are added to an aqueous suspension of the berthollide to effect the doping reaction; the amount of cobalt doping ranges from 1 to 9 wt %, preferably from 2 to 8 wt %, on the basis of the substrate particles; if a ferrous salt is also used, the amount of its doping ranges from 1 to 10 wt %, preferably from 3 to 8 wt %, as $Fe^{2+}$; the doped berthollide particles are heated to 80–95° C. and aged for 2–7 hours; after aging, the particles are filtered, washed with water and dried to be worked up to cobalt-doped ferromagnetic iron oxide particles.

With a view to improving the pigment dispersibility and other properties of the cobalt-doped ferromagnetic iron oxide powder, at least one element of the group consisting of the compounds of Al, Si, Ti, V, Cr, Mn, Ni, Cu, Zn, Zr, Ag, Sn, Sb, Mo and W may be added in the presence of the cobalt salt or ferrous salt during the doping reaction or, alternatively, at least one element of the group consisting of the hydroxides of Al, Si, Ti, V, Cr, Mn, Ni, Cu, Zn, Zr, Ag, Sn, Sb, Mo and W may be contained in the surfaces of the cobalt-doped ferromagnetic iron oxide particles.

The advantages of the present invention will become more apparent by reading the following specific examples of the invention, which are provided for illustrative purposes only and by no means intended to limit the scope of the invention.

EXAMPLE 1

A tank equipped with a gas feed pipe but not having a stirrer was charged with 30 L of an aqueous ferrous sulfate solution containing 30 g/L of $Fe^{2+}$, which was adjusted to 35° C. Thereafter, 1.61 L of an aqueous sodium hydroxide solution (400 g/L) adjusted to 35° C. was added. By mixing under agitation with nitrogen gas, a slurry of ferrous hydroxide was formed. After 200 mL of an aqueous solution containing 13.2 g of sulfurous acid (which was equivalent to 2.0 mol % of the iron precipitate) was added air was subsequently blown in for 5 hours to oxidize the ferrous hydroxide completely to yield reddish yellow seed crystals. Subsequently, the slurry containing the seed crystals was heated to 50° C. and, with air blown in, an aqueous sodium hydroxide solution (400 g/L) was supplied at constant rate so that the growth reaction was completed in 15 hours. The resulting hydrated iron oxide particles had a specific surface area of 48.9 $m^2/g$.

EXAMPLE 2

A tank equipped with a stirrer was charged with 30 L of an aqueous ferrous sulfate solution containing 50 g/L of $Fe^{2+}$, which was adjusted to 35° C. Thereafter, 2.68 L of an aqueous sodium hydroxide solution (400 g/L) adjusted to 35° C. was added. By mixing under agitation with nitrogen gas, a slurry of ferrous hydroxide was formed. After 200 mL of an aqueous solution containing 22.0 g of sulfurous acid (which was equivalent to 2.0 mol % of the iron precipitate) was added, air was subsequently blown in for 5 hours to oxidize the ferrous hydroxide completely to yield reddish yellow seed crystals. Subsequently, the slurry containing the seed crystals was heated to 50° C. and, with air blown in, an aqueous solution sodium hydroxide (400 g/L) was supplied at constant rate so that the growth reaction was completed in 8 hours. The resulting hydrated iron oxide particles had a specific surface area of 50.2 $m^2/g$. An electron photomicrograph of the hydrated iron oxide particles is shown in FIG. 1; obviously, they were substantially free from the dendrites and had not only a high aspect ratio but also a narrow size distribution.

EXAMPLE 3

The procedure of EXAMPLE 1 was repeated, except that the addition of sulfurous acid was reduced to 5.5 g (equivalent to 0.5 mol % of the iron precipitate). The resulting hydrated iron oxide particles had a specific surface area of 35.3 $m^2/g$.

EXAMPLE 4

The procedure of EXAMPLE 2 was repeated, except that the addition of sulfurous acid was increased to 55.0 g (equivalent to 5.0 mol % of the iron precipitate). The resulting hydrated iron oxide particles had a specific surface area of 64.8 $m^2/g$.

EXAMPLE 5

The procedure of EXAMPLE 3 was repeated, except that the aqueous sodium hydroxide solution was replaced by aqueous ammonia containing 350 g/L of $NH_4OH$. The resulting hydrated iron oxide particles had a specific surface area of 34.1 $m^2/g$.

EXAMPLE 6

The procedure of EXAMPLE 2 was repeated, except that the sulfurous acid was replaced by 27.9 g of sodium hydrogensulfite (equivalent to 2.0 mol % of the iron precipitate). The resulting hydrated iron oxide had a specific surface area of 47.7 $m^2/g$.

EXAMPLE 7

The hydrated iron oxide obtained in EXAMPLE 2 was filtered, washed with water, repulped, treated with sodium hexameta-phosphate to achieve P doping in an amount of 0.3 wt % of the hydrated iron oxide, washed with water again and dried at 110° C. The resulting hydrated iron oxide particles were dehydrated by heating at 650° C. for 0.5 hour in air to yield hematite particles. The hematite particles were reduced under a hydrogen gas stream containing $CO_2$ gas at 35° C. for 3 hours and subsequently oxidized at 90° C. for 2 hours to yield berthollide particles having an iron (II) content of 18.0 wt %. The berthollide particles had a coercive force (Hc) of 369 Oe and a saturation magnetization ($\sigma s$) of 82.0 emu/g as measured by conventional methods. A magnetic sheet prepared from these particles had a coercive force (Hc) of 373 Oe, a squareness ratio (Sq) of 0.828, an orientation ratio (OR) of 2.88 and a switched field distribution (SFD) of 0.583.

The magnetic sheet was prepared by the following method. A magnetic coating was first prepared from the recipe listed below using a small-scale sand grinder mill or other suitable device. The coating was then applied onto a polyester film 25 $\mu$m thick by means of an applicator, oriented in a magnetic field and dried to be worked up to a magnetic sheet having a dry deposit thickness of 10 $\mu$m. The same procedure was employed to prepare the magnetic sheets tested in the following examples.

| | |
|---|---|
| Magnetic iron oxide powder | 100.0 (parts by weight) |
| Dispersant | 1.8 |
| Lubricant | 1.5 |
| Vinyl chloride-vinyl acetate copolymer resin | 10.6 |
| Polyurethane resin | 10.6 |
| Curing agent | 2.1 |
| Cyclohexanone | 45.0 |
| Methyl ethyl ketone | 135.0 |
| Toluene | 45.0 |

EXAMPLE 8

The procedure of EXAMPLE 7 was repeated to yield maghemite particles, except that following the reduction under a hydrogen gas stream containing $CO_2$ gas, the hematite particles were oxidized at 300° C. for 2 hours. The maghemite particles had a coercive force (Hc) of 386 Oe and a saturation magnetization ($\sigma s$) of 72.6 emu/g. A magnetic sheet prepared from these particles had a coercive force (Hc)

of 388 Oe, a squareness ratio (Sq) of 0.845, an orientation ratio (OR) of 2.90 and a switched field distribution (SFD) of 0.466.

EXAMPLE 9

The berthollide particles (100 g) obtained in EXAMPLE 7 were dispersed thoroughly in 500 mL of pure water by intense mechanical agitation and, with nitrogen gas blown in, 500 mL of an aqueous sodium hydroxide solution (400 g/L) was added under agitation at 35° C. Subsequently, an aqueous solution having 12.2 g of cobalt sulfate ($CoSO_4.7H_2O$; 98% pure) dissolved therein and which was adjusted to 125 mL and an aqueous solution having 35.5 g of ferrous sulfate ($FeSO_4.7H_2O$; 98% pure) dissolved therein and which was adjusted to 125 mL were added and the mixture was aged at 95° C. for 5 hours. The resulting precipitate was filtered, washed with water and dried in air at 55° C. for 10 hours to yield cobalt-doped magnetic iron oxide particles having an iron(II) content of 15.3 wt %. These particles had a coercive force (Hc) of 620 Oe and a saturation magnetization ($\sigma s$) of 79.9 emu/g. A magnetic sheet prepared from the particles had a coercive force (Hc) of 669 Oe, a squareness ratio (Sq) of 0.841, an orientation ratio (OR) of 2.96 and a switched field distribution (SFD) of 0.507.

EXAMPLE 10

The procedure of EXAMPLE 9 was repeated, except that the berthollide particles were replaced by the maghemite particles obtained in EXAMPLE 8. The resulting cobalt-doped magnetic iron oxide particles had a coercive force (Hc) of 638 Oe and a saturation magnetization ($\sigma s$) of 76.2 emu/g. A magnetic sheet prepared from the particles had a coercive force (Hc) of 691 Oe, a squareness ratio (Sq) of 0.868, an orientation ratio (OR) of 2.99 and a switched field distribution (SFD) of 0.419.

COMPARATIVE EXAMPLE 1

Figure 2:
FIG. 2 is an electron photo-micrograph of the hydrated iron oxide produced by the method of a comparative example.

The procedure of EXAMPLE 2 was repeated, except that sulfurous acid was not added during the reaction for the formation of seed crystals. The resulting hydrated iron oxide particles had a specific surface area of 25.3 $m^2/g$. An electron photo-micrograph of the particles is shown in FIG. 2. Obviously, they had many dendrites and a broad particle size distribution.

What is claimed is:

1. A process for producing hydrated iron oxide comprising the first step of adding an aqueous alkali solution to an aqueous solution of a ferrous salt in an amount no more than a neutralizing equivalent amount with respect to said ferrous salt to form a suspension containing ferrous hydroxide, the second step of oxidizing said suspension to form a suspension containing the seed crystals of hydrated iron oxide and the third step of supplying an additional amount of an alkali to said suspension containing hydrated iron oxide and oxidizing said suspension to have the hydrated iron oxide grow, characterized in that sulfurous acid or a sulfite is added in said first step in an amount of 0.1–10 mol % of the ferrous salt which will be neutralized to precipitate during the reaction of forming the seed crystals.

2. The process according to claim 1, wherein said sulfurous acid or sulfite is added in an amount of 0.3–6 mol %.

3. The process according to claim 1, which further includes the fourth step of heating to fire the resulting hydrated iron oxide so as to produce acicular hematite particles and the fifth step of reducing said acicular hematite particles to magnetite.

4. The process according to claim 3, which further includes the sixth step of oxidizing the resulting magnetite to berthollide ($FeO_x$; 1.33<x<1.5) or maghemite.

5. The process according to claim 3, which further includes the step of coating the surfaces of the resulting magnetite particles with a cobalt-containing layer.

6. The process according to claim 4, which further includes the step of coating the surfaces of the resulting berthollide or maghemite particles with a cobalt-containing layer.

* * * * *